(No Model.)
H. L. CORDREY.
SHAFT SUPPORT FOR VEHICLES.
No. 479,631. Patented July 26, 1892.
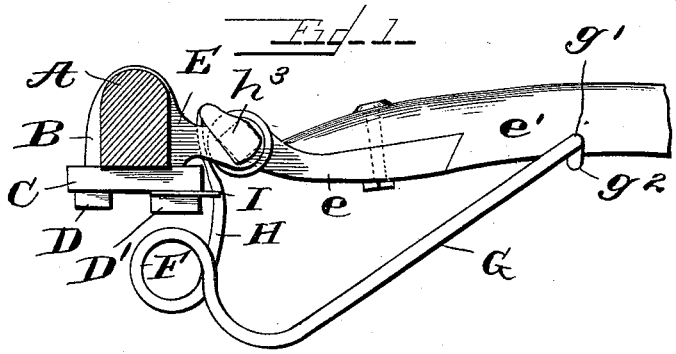
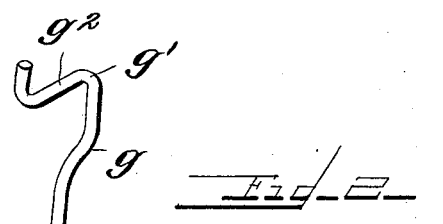
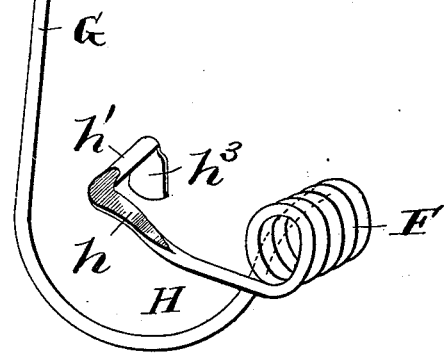
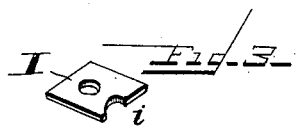
Witnesses
G. A. Tauberschmidt
C. T. Belt
Inventor
Henry L. Cordrey
By Edwin S. Clarkson
his Attorney

UNITED STATES PATENT OFFICE.

HENRY L. CORDREY, OF MOUNT UNION, IOWA.

SHAFT-SUPPORT FOR VEHICLES.

SPECIFICATION forming part of Letters Patent No. 479,631, dated July 26, 1892.

Application filed February 24, 1892. Serial No. 422,661. (No model.)

*To all whom it may concern:*

Be it known that I, HENRY L. CORDREY, a citizen of the United States, residing at Mount Union, in the county of Henry and State of Iowa, have invented certain new and useful Improvements in a Combined Anti-Rattler and Shaft-Support; and I do hereby declare the following to be a full, clear, and exact description of the invention, such as will enable others skilled in the art to which it appertains to make and use the same.

My invention relates to a combined anti-rattler and shaft-support.

It consists of a coiled spring having two uncoiled ends, one of which is longer than the other and is bent at substantially right angles to its body, then bent back again to form a loop at its end, which, when in position, rests under the shafts of a vehicle. The center of said loop is directly in line with the main body of this uncoiled end. The shorter uncoiled end is substantially at right angles to the coil of the spring and its upper position is given a curvature, said curved position being flattened. Said end is then bent at right angles to extend across the thill-eye and is again bent at right angles to extend down over the head of the coupling-bolt, this latter portion being flattened out to form a broad surface in order to cover the head of said bolt. Between the clip-plate and the nut securing it to the clip I place a guide having a notch in its front end, in which the shorter uncoiled end rests, thus insuring its being always in the proper position. I have shown a headed bolt in the drawings; but it is obvious that a countersunk bolt will serve equally as well.

In the drawings, Figure 1 is a side and end view of an axle and shafts with my invention attached. Fig. 2 is a perspective view of my invention detached. Fig. 3 is a view of the guide.

A represents the axle; B, the clip; C, the clip-plate; D and D', the nuts securing the same to the clip, and E the perforated bearing-ears projecting from the clip.

e is the thill-iron, and e' the shafts.

F is a coiled spring, which may be made of wire of any suitable diameter or shape in cross-section. Extending from this coiled portion is an arm G of general curvature, as shown. This arm is bent slightly at $g$ to one side, then bent at $g'$ at right angles to its main body and formed into what may be termed a "loop" $g^2$, in which, when the device is in position, the shafts rest.

H is another arm extending from the coiled portion F and is much shorter than the arm G. This arm H extends upward between the clip-plate and the eye of the thill-iron and is flattened out, as at $h$, thus permitting this portion to fit snugly and bear against the eye of the thill-iron. At $h'$ this arm H is bent at right angles, said bent portion extending to the outside of the bearing-ears E, where it is again bent at right angles downward. This latter bent portion $h^3$ is flattened out and adapted when in position to bear against and cover the head of the coupling-bolt. To prevent the arm H from lateral movement, I secure a plate I between the clip-plate C and nut D', which projects a slight distance in front of the axle and is provided with a notch $i$ of suitable shape.

To attach my invention to a vehicle, I pass the short arm H up between the clip-plate and thill-iron eye, then push it into the opening in the guide. I then place the loop $g^2$ of the arm G under the shafts. When it is desired to take off the shafts for any reason, I simply take the loop $g^2$ from under the shafts, thus freeing the head of the bolt.

What I claim, and desire to secure by Letters Patent, is—

1. In a combined anti-rattler and shaft-support, the combination of a spring-body having two arms, one of which extends up and is provided with a curved flattened portion and a flattened portion adapted to lock a coupling-bolt in place, the other arm being provided with a loop, substantially as described.

2. A combined anti-rattler and shaft-support consisting of the coiled spring having two arms, one longer than the other, the shorter arm being provided with a flattened curved portion adapted to bear against the thill-eye and a flattened portion at right angles thereto adapted to bear against the coupling-pin, while the longer arm near its free end is bent at an angle and thence back at right angles to itself, whereby a loop $g^2$ is formed, the center of which is directly in line with the main body of said arm, in combination with the plate I, having a notch in its forward edge in which said short arm rests, whereby the whole is held in proper position.

In testimony whereof I affix my signature in presence of two witnesses.

HENRY L. CORDREY.

Witnesses:
DANIEL WESTFALL,
C. P. DAILEY.